(12) United States Patent
Malone et al.

(10) Patent No.: US 7,743,615 B2
(45) Date of Patent: Jun. 29, 2010

(54) BUFFERED HEAT TRANSFER FLUID FOR SECONDARY REFRIGERATION SYSTEMS COMPRISING A FORMATE SALT

(75) Inventors: Gilbert R. Malone, Perry, OH (US); Stephen H. Stoldt, Concord Township, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 868 days.

(21) Appl. No.: 10/545,830

(22) PCT Filed: Feb. 17, 2004

(86) PCT No.: PCT/US2004/004586

§ 371 (c)(1), (2), (4) Date: Oct. 19, 2006

(87) PCT Pub. No.: WO2004/078876

PCT Pub. Date: Sep. 16, 2004

(65) Prior Publication Data

US 2007/0194270 A1    Aug. 23, 2007

Related U.S. Application Data

(60) Provisional application No. 60/450,744, filed on Feb. 28, 2003.

(51) Int. Cl.
*C09K 5/04* (2006.01)
*F25B 23/00* (2006.01)
*F25D 17/02* (2006.01)
*C09K 5/00* (2006.01)
*C09K 13/02* (2006.01)

(52) U.S. Cl. ............... 62/114; 62/467; 62/434; 252/67; 252/68; 252/71; 252/73; 252/74; 252/75; 252/79.5

(58) Field of Classification Search .......... 252/68, 252/79, 71, 67, 70, 73, 74, 75, 76, 77; 62/434, 62/114, 467, 513
See application file for complete search history.

(56) References Cited

U.S. PATENT DOCUMENTS

| | | | | |
|---|---|---|---|---|
| 3,085,975 A * | 4/1963 | Jennings | ...... | 210/697 |
| 4,452,715 A * | 6/1984 | Hirozawa | ...... | 252/75 |
| 5,484,547 A * | 1/1996 | Mendoza | ...... | 252/73 |
| 6,059,996 A | 5/2000 | Minks et al. | | |
| 6,983,614 B2 * | 1/2006 | Dick et al. | ...... | 62/114 |
| 2001/0081497 * | 11/2001 | Dick et al. | ...... | 62/114 |
| 2002/0003223 A1 | 1/2002 | Smith et al. | | |
| 2004/0040336 A1* | 3/2004 | Dick et al. | ...... | 62/434 |

FOREIGN PATENT DOCUMENTS

| | | |
|---|---|---|
| DE | 196 18 267 A1 | 11/1997 |
| EP | 0 677 563 A1 | 10/1995 |
| WO | WO 01/81497 A2 | 11/2001 |

* cited by examiner

*Primary Examiner*—Ling-Siu Choi
*Assistant Examiner*—Monique Peets
(74) *Attorney, Agent, or Firm*—Samuel B. Laferty; David M. Shold; Christopher D. Hilker

(57) ABSTRACT

A formate salt based heat transfer fluid having a pH containing a phosphate for a secondary refrigeration loop is disclosed. The formate based heat transfer fluid generally is a more effective heat transfer medium than a glycol based fluid designed to operate in the same temperature range. The formate based fluid also has lower toxicity and environmental risks than the glycol fluid.

14 Claims, No Drawings

BUFFERED HEAT TRANSFER FLUID FOR SECONDARY REFRIGERATION SYSTEMS COMPRISING A FORMATE SALT

This application claims priority from U.S. Provisional Application No. 60/450,744, filed Feb. 28, 2003.

FIELD OF INVENTION

Secondary refrigeration fluids are used to transfer heat from a heat source to a source of cooling, typically a refrigeration unit. Secondary refrigeration fluids are members of the broader class of heat transfer fluids. The heat transfer fluids used in refrigeration have to remain fluid at low temperatures such as below 0° C. and preferably below −40° C. The heat transfer fluid disclosed herein includes a buffered formate salt of sodium or potassium which acts as an electrolyte to reduce the freezing point of the water used in the solution.

BACKGROUND OF INVENTION

Ethylene glycol and propylene glycol water solutions are popular heat transfer fluids due to the low corrosivity of the glycols and the low fire hazard associated with them. A problem with these solutions is their potential toxicity both to the environment and to food products or animals and the decrease in thermal conductivity of water solutions as the glycol concentration increases. Heat transfer solutions are often used in secondary refrigeration loops to transfer heat from a heat source to a source of cooling such as a compression refrigeration unit. A plethora of advantages can be had from using a secondary refrigeration loop rather than transporting the primary refrigerant to remote heat exchangers, which are in contact with a heat source.

A de-icer composition was disclosed in GB 1111936. The composition included urea, and an alkali metal or ammonium salt of a saturated carboxylic acid which contains up to 6 carbon atoms. U.S. Pat. No. 5,104,562 disclosed a coolant composition that comprised from about 3 to 9 parts by weight water, from about 1 to 2 parts by weight potassium formate, from about 1 to 9 parts by weigh of potassium acetate, from about 0 to 1.5 parts by weight urea, and from about 0 to 1.5 parts by weight of a glycol. U.S. Pat. No. 6,059,966 discloses a low-viscosity, aqueous coolant brine based on inhibited alkali metal acetates and/or formates having improved corrosion protection, wherein the coolant brines contain 0.2 to 5% by weight of alkali metal sulfites or pyrosulfites. WO9309198 disclosed a vapor absorbent composition comprising potassium formate for an absorbent refrigeration, air conditioning, heat pumping or dehumidifying system. WO9639472 disclosed a method for performing heat exchange transfer with a heat transfer medium and a heat exchange apparatus. The pumpable heat transfer medium for performing heat transfer with a target (b) was characterized in that it contains potassium formate dissolved in water. Canadian patent application 2,220,315 disclosed a composition comprising: (1) at least one potassium salt of a $C_{1-9}$ carboxylic acid; and (2) a corrosion inhibitor package comprising: (a) sodium or potassium nitrite; (b) sodium borate pentahydrate; and (c) tolytriazole. EP 677 563 to Linde discloses a method of operating a refrigerating plant using an aqueous potassium formate solution as the refrigerant. WO 01/81497 assigned to Lubrizol Corp. was published Nov. 1, 2001 and taught potassium formate heat transfer fluids.

It would be desirable to identify a heat transfer fluid with lower toxicity than glycol solutions and desirably having better heat transfer properties and minimal tendency toward metal corrosion.

SUMMARY OF INVENTION

A buffered heat transfer medium comprising a formate salt in water containing selected, compatible corrosion inhibitors and/or biocides is disclosed. A preferred use is in secondary refrigeration loops to transfer heat from a heat source to a source of cooling such as a compression refrigeration unit or absorption refrigeration unit. The formate is the primary electrolyte used to reduce the freezing temperature of the solution. The pH of the heat transfer medium is desirably adjusted above 8. Other electrolytes or conventional freezing point depressors such as glycols or alcohols can be present, but are not required. Selected corrosion inhibitors and biocides are desirably present for applications where the system includes metals and the solution will be recycled and reused. Desirably the corrosion inhibitors and biocides are water soluble compounds.

The heat transfer medium is particularly desirable in applications where the primary refrigerant (defined as the working fluid which transfers heat from or to the system) is desirably excluded from environments where its presence or the presence of a relatively toxic refrigeration fluid would present health or safety concerns.

DETAILED DESCRIPTION OF THE INVENTION

The formate salt can be potassium or optionally sodium, optionally including trace contaminants such as other salts from the water source. These contaminants would typically be contaminants found in tap or drinking water supplies such as calcium, magnesium, carbonate, chloride, fluoride, and iron ions, etc. The ability to prepare the heat transfer fluid with conventional tap water and/or industrial make up water is a particular advantage. Various additives can be added to the heat transfer fluid to help it accommodate impurities. These might be additional biocides, scavengers for chlorine, and complexing agents such as ethylenediaminetetraacetic acid or its salt.

Desirably the solution is from about 2 to about 77 weight percent of a formate salt of potassium and/or sodium. More desirably the formate salt is from about 5 or 15 to about 75 weight percent and preferably from about 10 to about 60 weight percent of the heat transfer fluid. Desirably the formate salt is at least 50 mole percent of the total salts in the solution and more desirably at least 75 or 80 mole percent. Desirably the acetate salts are less than 10 mole % of the formate salts. The formate solution can contain other materials like acetate salts of sodium or potassium or alkylene glycols (ethylene glycol or propylene glycol). While glycols can be present at various concentrations, depending on the particular application, preferred concentrations for use with the formate salt are either substantially no glycol at all or concentrations from about 0.1 to about 5 or 10 weight percent based upon the weight of the fluid. These components may be present in any concentration in the heat transfer fluid and may be residually in the unit, accidentally present, or added for specific purposes. While it is later taught that the formate solutions have better heat transfer properties than the glycol solutions and improved properties over an acetate salt solution, the system is tolerant to these components and they may be added for specific purposes.

The formate offers many advantages over the glycol type solutions. It has better heat transfer and it has much lower toxicity than glycol in cases of food contamination or with respect to the environmental concerns with spills etc. The pH of the formate solution is desirably adjusted above 8, more desirably from about 8 to 12 and most desirably from 8.5 or 9 to 11 and preferably from 9.5 to 10 or 10.7 to minimize corrosion. The fluid can be buffered with various buffers to control the pH variation should the heat transfer solution be further diluted or contaminated with an acid or base. The buffer can comprise various alkali metal phosphates, borates and carbonates and/or glycines. These include combinations such as sodium phosphate, disodium phosphate, and trisodium phosphate, various borates, glycine, and combinations of sodium bicarbonate and sodium carbonate. The counter ions e.g. sodium, potassium, lithium, calcium, and magnesium are not critical to the buffering and due to the presence of excess potassium may exchange with other cations. Calcium and magnesium salts are less preferred due to their bivalent nature and other considerations. Solubility of the buffers in concentrated potassium formate is a concern.

The presence of buffer in the heat transfer fluid has been observed to have a significant effect on the efficiency of the corrosion inhibiting agents. This is believed to be a combination of providing an optimum or near optimum pH for the corrosion inhibitors to do their job and supplying an alkalinity reserve that prevents the pH of the fluid from shifting downward, where the corrosion inhibitors might be less effective. The effect of pH on the corrosion inhibitors beyond sulfamic acid has not been fully explored. For the purpose of this application we will define the amount of buffer as the amount of the buffer component that has a pH as a 1 wt. % solution in distilled water of above 10.0. Thus amounts of buffer components having a pH below 10.0 will not usually be specified although they will inherently be present. Desirably these buffers (i.e. with a pH above 10.0) are present in amounts from about 0.1 to about 10 wt. %, more desirably from about 0.5 or 1 to about 3 or 5, and preferably from about 0.5 or 1 to about 3 wt. % based on the weight of the fluid. It is further defined that if basic versions of alkali metals are added to the heat transfer fluid, these may convert other alkali metal phosphates, borates, and carbonates (optionally also glycine) into forms that would thereafter be considered buffers having a pH above 10.0. If this happens, then the converted materials would be counted in the total amount of buffers having a pH above 10.0 characterized as a 1 wt. % solution in water.

It is desirable that the formulated heat transfer fluid have a reserve alkalinity such that small amounts of acidic contaminants or acidic reaction products don't shift the pH of the heat transfer fluid below a pH of 8. Desirably the reserve alkalinity is measured according to ASTM D1121-98. Desirably the reserve alkalinity of the fluid is from about 5 to about 40 mL of 0.100N HCl per 10 mL of sample to reach a pH of 5.5. More desirably the reserve alkalinity of a less concentrated potassium formate solution (e.g. 10-30 wt. % alkali formate based on total fluid wt.) is from about 5 to about 20 mL of 0.100N HCl per a 10 mL sample and a more concentrated potassium formate (e.g. 30-65 wt. % alkali formate) would have a reserve alkalinity of from about 20 to about 40 mL of 0.100N HCl per 10 mL of sample.

The concentration of the formate salt in the heat transfer fluid only needs to be high enough to prevent freezing of the heat transfer fluid. This is usually accomplished by determining the coldest temperature to which the heat transfer fluid will be exposed and then forming a heat transfer fluid that will remain unfrozen at a temperature at least 5° C. colder than the anticipated temperature.

Water is a preferred heat transfer fluid over many organic compounds due to its low viscosity and non-toxic nature as well as its higher heat capacity and heat transfer coefficient. However, water freezes at about 0° C. and the formate salt is necessary to allow the use of the water without freezing (to keep the water as a pumpable liquid under conditions below 0° C. when used as a coolant for low temperature applications).

Desirably the water is present in the formate solutions at concentrations of at least 20 weight percent based on the weight of the heat transfer fluid and more desirably from about 23 or 25 to about 95 or 98 weight percent of the heat transfer fluid and preferably from about 50 to about 90 weight percent. In many glycol based heat transfer fluids a purified or distilled water is recommended to obtain good heat transfer activity and longer fluid life. With said invention tap water may be used to make up the heat transfer fluid and tap water may be used to dilute the heat transfer fluid.

Selected corrosion inhibitors which exhibit good solubility in high salt aqueous solutions are used in the formate salt based heat transfer fluids. These corrosion inhibitors may be present in concentrations up to 4 weight percent and desirably above 0.01 weight percent or from about 0.1 weight percent up to 2 weight percent based on the weight of the heat transfer fluid. Corrosion inhibitors include triazole inhibitors such as benzotriazole (preferred in combination), substituted benzotriazoles, tolyl triazole and its derivatives (e.g. Irgamet® 42), benzimidazole, a diazole such as dimercaptothiadiazole (preferred in combination); water-soluble aryl sulfonates, citric acid, sulfamic acid (preferred), inorganic nitrites, and mixtures of $C_5$ to $C_8$ monocarboxylic acid or alkali-, ammonium- or amino-salts of said acid, a $C_2$-$C_8$ dicarboxylic acid or alkali-, ammonium- or amino-salts of said acid (Irgacor® L 190). Vapor phase corrosion inhibitors can also be added to the fluid and would reduce corrosion on surfaces that are not always in contact with the fluid. A preferred vapor phase corrosion inhibitor would be tertiary amine, $R_3N$, where R contains 1 to 4 carbon atoms. Vapor phase corrosion inhibitors are generally desirable at concentrations up to 0.3 weight percent based on the weight of the fluid. Borates e.g. borax (optionally used as buffers) may also function as a corrosion inhibitor.

Biocides are also desirable components in the heat transfer fluid. The biocides prevent the growth of various plant and animal life that may be introduced from the water supply or which have been growing in the prior heat transfer fluid. Desirably the biocide is present at a concentration of less than 0.5 weight percent and more desirably less than 0.3 weight percent. Preferred biocides are various copper salts that can effectively control most plant and animal growth at less than 0.025 weight percent concentrations and more desirably less than 0.005 weight percent based on the weight of the heat transfer fluid. The copper cation seems to be primarily associated with the biocide activity. With these copper salts the actual copper concentration is less than 100 ppm and more desirably less than 25 ppm. Suitable copper salts include copper acetate, copper sulfate, and copper citrate. The copper salts may also improve the thermal conductivity of the heat transfer solution and assist in preventing certain types of corrosion. Glutaraldehyde can also be added to the fluid as a biocide. Borates also inhibit growth of bacteria, etc.

Desirably both the corrosion inhibitors and the biocide are soluble at levels higher than that necessary for many applications so that the entire heat transfer fluid can be prepared as a concentrate. This provides an opportunity to deliver the effective concentrations of corrosion inhibitor and/or biocide upon dilution with water at the site of use to form a heat transfer fluid.

One can also include metal ion scavengers (chelating agents) such as ethylenediaminetetraacetic acid or its salt (EDTA). Desirable concentrations of chelating agents are up to 2 or 6 weight percent and more desirably from about 0.2 to about 6 weight percent based on the weight of the fluid (heat transfer composition.

The heat transfer fluid using formate salt is useful as the transfer medium to transfer heat from a target (the object to be cooled) to a heat sink or vice versa to transfer heat to a target (the object to be heated) from a heat source to effect cooling or heating, respectively of the target. The use of both cooling and heating occurs in geothermal heating and/or cooling where the heat sink is typically the earth's crust at a depth of 2 to 6 feet and heat or cooling is transferred from this heat sink to the compression refrigeration system. Thereafter the compression refrigeration system transfers the heat or cooling to the building or other target to be heated or cooled. The cooling/heating source can be a compression refrigeration system an absorption refrigeration system, a heat pump, or any other source of cooling or heating (e.g. a heat sink comprising a refrigerated fluid). Secondary loop heat transfer fluids are used in a variety of systems where the primary refrigerant is to be physically isolated from the final application of heating or cooling. The secondary loop systems will be defined as where a heat transfer medium is used to transport heat energy from a target to a primary refrigeration system or transfer heat energy from a heat source to a target (e.g. geothermal heating). The primary refrigeration system is where heat is transferred to the external environment (heat sink) by way of a primary refrigerant or vice versa. The primary refrigerant may use a compressor refrigeration system or an absorbent refrigeration system.

The purpose of isolating the primary coolant from the heat sink or target can vary but may include hazards associated with the primary refrigerant (e.g. toxicity, flammability), cost of the primary refrigerant, difficulty transporting the primary refrigerant (e.g. possibly factors such as the need for higher cost transport lines, higher cost heat transfer equipment (heat exchangers), viscosity problems, concerns about pressure, concerns about returning all the components of the primary refrigerant back to the compressor), ability to store cheaper fluids and their thermal energy during low energy cost periods etc. Systems that include a secondary loop offer advantages in that they can be very compact in design, can be factory built and charged with the primary refrigerant, are capable of operating with an extremely small charge of refrigerant, and can be located at a central or remote location e.g. a roof top, a ventilated room or somewhere away from humans where vibrations or noise of operation might be a concern. Incorporated herein by reference are U.S. Pat. No. 5,819,549; U.S. Pat. No. 5,104,562; WO 99/37733; and WO 96/39472 including their disclosures about coolants, transfer efficiency measurements, and problems with the prior art heat transfer fluids.

In compression refrigeration, the refrigerant is desirably an organic (e.g. butane) or halogenated organic refrigerant (e.g. CFC, HCFC, or HFC) or an inorganic refrigerant (e.g. $CO_2$ or ammonia). The heat transfer fluid is particularly desirable with fluorocarbon based refrigerant systems because the secondary heat transfer fluid is pumped at much lower pressures than the fluorocarbon and minimizes the risk of fluorocarbon system leaks by minimizing the portion of the system occupied by the fluorocarbon (fluorocarbon doesn't have to be present in portion of system occupied by the secondary heat transfer fluid). In ammonia based compression refrigeration systems the formate salt heat transfer fluid helps minimize the total volume of ammonia needed without reducing capacity of the system. This allows the use of ammonia in geographical areas where larger volumes of ammonia would constitute a significant hazard to human safety or life if a leak occurred.

Other refrigerant fluids include alkanes of 1-10 carbon atoms with butane and propane being preferred or things like carbon dioxide. The formate salt heat transfer fluid can also be used in closed environments (buildings with minimal ventilation) where an ammonia heat transfer fluid would be hazardous. Typically secondary loop fluids need to be able to be cooled to at least −15° C. or −25° C. and possibly down to −30° C. or −40° C. without becoming a solid or so viscous that pumping becomes difficult.

The heat transfer fluid can be used for heating or cooling applications, i.e. in application where the refrigerant is being used to pump heat from a heat sink (heating) or to pump heat into a heat sink (cooling). The article to be heated can be a climate control for humans or animals or it can be an application where a chemical composition is being heated or other commercial application where heat is being applied. Alternatively on the cooling side, cooling can be used for climate control, including dehumidifying, or to refrigerate or freeze a chemical composition, foodstuff, or in a commercial or residential application requiring cooling. Cooling is also an important part of food processing where foodstuffs are prepared and then quickly cooled or frozen to preserve their nutrients and avoid decomposition or contamination by bacterial or fungal growth. While a preferred embodiment involves use of the heat transfer fluid with a compression or absorptive refrigeration equipment, the heat transfer fluid can be used in other applications where temperature control is achieved by pumping a fluid through composition of matter e.g. as using a fluid to control temperature in an internal combustion engine or using a fluid to control the temperature in a reactor or under material molding conditions.

EXAMPLES

Various combinations of at least potassium formate, optionally including potassium acetate and/or potassium nitrate were prepared in water and tested for heat transfer capacity, freezing points, corrosivity, and viscosity at reduced temperatures. The effect of various concentrations of the above components on the thermal conductivity, corrosion tendencies, freezing points, pH, and Brookfield viscosity at −40° C. were observed and recorded. The solutions compared favorably with propylene glycol solutions in terms of thermal conductivity. The solutions could be prepared with low corrosion tendencies towards copper and other metals. The solutions maintained low viscosities down to −40° C.

Samples of a heat transfer fluid comprising a first sample of 60 wt. % potassium formate in water (Example 1) without any corrosion inhibitor and a second sample of 60 wt. % potassium formate with 0.1 wt. % sulfamic acid (Example 2) were compared in corrosion test. The pH of both samples was adjusted to 9.5-10 with KOH. Table 1 shows the effect of the potassium salt of sulfamic acid on weight change due to corrosion of immersed metal coupons during a two week storage test at 25° C. The metal coupons are the same as used in the galvanic corrosion test described below.

TABLE 1

Effect of Salt of Sulfamic Acid on Corrosion

| Metal | Coupon wt. g | 60 wt. % HCOOK (Example 1) | 60 wt. % HCOOK with 0.1% sulfamic acid (Example 2) |
|---|---|---|---|
| Cu | 12.9 | −0.0065 g | −0.0009 g |
| Steel | 11.6 | −0.1795 g | −0.0003 g |
| Al | 4.1 | −0.0028 g | 0.0002 g |

ASTM D1384 was used to measure the weight loss of metal coupons after being exposed to potassium formate solution with sodium benzotriazole or sulfamic acid corrosion inhibitor. The potassium formate solution was 60 wt. % concentration. The pH was adjusted to 9.5-10.0 with KOH. Benzotriazole was added to prepare Example 3. Sulfamic acid was added at two different levels to the sample before the pH adjustment (Examples 4a and 4b). A third pH buffered sample (Example 5) was prepared as shown below:

Aqueous potassium formate (75 wt. %) [1467 g] was added to de-ionized water [448.5 g] with stirring, trisodium phosphate (TSP) [34.5 g] was dissolved in the formate solution followed by disodium phosphate [20 g]. When the salts were dissolved, sulfamic acid [10 g] was added. Sodium nitrite [20 g] was then stirred into to the clear solution (Example 5).

All of the ASTM D 1384 coupons for Examples 3-5 were put in the same bath The coupons were similar in composition and polish to the samples for the galvanic corrosion test. They were assembled together as a package. They were not connected to any electrical grounding equipment (i.e. they were electrically isolated except for the electrolyte). The surface area of each coupon was about 1300 $mm^2$ and the weight of each coupon ranged from 9 g for cast Al to 25 g for cast iron. Each coupon was weighed prior to the test and after immersion in the solution for two weeks (336 hrs). The values represent the change in the sample weight after 336 hours. A negative value indicates that the coupon lost weight during the test. The temperature of the solution was 88° C. The coupons or samples were fully immersed.

TABLE 2

Comparison of Benzotriazole and Sulfamic Acid Salt as Corrosion Inhibitors.

| Metal | 60 wt. % HCOOK with 0.2% benzotriazole Example 3 | 60 wt. % HCOOK with 0.5% sulfamic acid * Example 4a | 60 wt. % HCOOK with 0.02% sulfamic acid * Example 4b | 55 wt. % HCOOK with pH buffer, sulfamic acid, and nitrite Example 5 |
|---|---|---|---|---|
| Cu | 0.0046 g | 0.0118 g | 0.0004 g | 0.0041 |
| Solder | −0.261 g | −0.3561 g | 0.0953 g | −0.0590 |
| Brass | 0.0048 g | 0.0078 g | −0.0007 g | 0.0081 |
| Steel | 0.0454 g | −0.0493 g | −0.0951 g | −0.0001 |
| Cast Fe | 0.0387 g | −0.0133 g | −0.0347 g | −0.0039 |
| Cast Al | 0.0048 g | 0.0415 g | −0.0152 g | 0.0104 |

* These samples also had 0.002 wt. % of copper citrate biocide therein.

Galvanic corrosion testing was conducted according to Guidelines for Conducting and Evaluating Galvanic Corrosion Tests in Electrolytes ASTM G71 using various metal coupons from Metaspec Co., P.O. Box 27707, San Antonio, Tex. 78227-0707. One lead was connected to a copper specimen while the other lead was connected to a mild steel specimen. The steel specimen was 304-O Mild Steel (SAE 1010 Cold Rolled, ½"×3"×⅟16", with a ¼" hole, ¼" from the end) and was polished to 280 grit. The copper specimen was a 304-A copper alloy (CA-110, QQ-C-576, annealed ETP, ½"× 3"×⅟16", with a ¼" hole, ¼" from the end) and polished to 280 grit. All specimen were washed with heptane then isopropanol and dried to remove any commercial corrosion inhibitor that may have been applied by the manufacturer. The sample of electrolyte was a volume of 258 mL and an air flow of 1 mL/min was added. The solution was stirred. Both samples were 55 wt. % potassium formate. Any dilution of the potassium formate to reach 55% was done with de-ionized water. Example 5 was compared to a 55 wt. % solution of potassium formate with pH adjusted to 10.0 using aqueous KOH (Example 6). The two electrodes were spaced 7 mm apart. The test temperature was 25° C. The test measures the tendency of a solution to develop an electrical potential or current when two dissimilar metals exist in contact with the electrolyte solution. Lower currents are more desirable. Results are shown in Table 3.

TABLE 3

Galvanic Corrosion Current of Heat Transfer Fluids (Cu vs. Fe)

| Heat Transfer Fluid | Corrosion Current, microamps |
|---|---|
| 55% HCOOK pH adjusted to 10.0 (Example 6) | 540 |
| 55% HCOOK pH buffered to 10.7 (Example 5) | 0.21 |

Another technique used to evaluate the tendency of various metals to corrode in the presence of fluids uses an instrument (available from Cortest) designed to generate a polarization scan of the potential change caused by net current to or from an electrode using the heat transfer fluid as the electrolyte. The test provides data on corrosion rate in mil per year (mpy) and the tendency of a fluid to cause pitting (mpy). Data are shown in Table 4.

TABLE 4

Potentiodynamic Scan Data on Corrosion and Pitting of Iron in Heat Transfer Fluids

| Heat Transfer Fluid | Iron Corrosion Rate, mpy | Pitting Rate, mpy |
|---|---|---|
| Example 6 | 3.1 | 10 |
| Example 5 | 0.7 | None |
| 40% solution of a material comparable to Example 5 in deionized water (Example 7) pH 9 | 1.4 | None |

Solutions of potassium formate were prepared to determine the general physical properties that could be expected of the solutions. The solutions were prepared by diluting with de-ionized water a concentrated 72 wt. % solution of potassium formate.

TABLE 5

Various Concentrations of Potassium Formate

| Concentration wt. % HCOOK | Viscosity centistokes −10/−20/−30° C. | pH | Specific Gravity | Freezing point ° C. |
|---|---|---|---|---|
| 72% | 19.6/35.1/74.3 | 9.88 | 1.5256 | −54 |
| 52% | 4.94/7.4/11.9 | 9.24 | 1.3665 | <−54 |
| 35% | 2.95/4.2/— | 8.65 | 1.2279 | −36 |

A series of dilutions with DI water were made from Example 5 and are shown in Table 6 below. The slush point (temperature at which ice crystals first form) and pH were measured on each sample.

TABLE 6 pH vs. Concentration of Heat Transfer Fluids (HTF)
Chart 1 pH vs. Concentration

| % Wt of Example 5 | % Wt HCOOK | pH | Slush Pt (° C., ° F.) |
|---|---|---|---|
| 100 | 55.0 | 10.7 | −64, −83 |
| 90 | 49.5 | 10.4 | −54, −65 |
| 80 | 44.0 | 10.2 | −48, −54 |
| 75 | 41.3 | 10.1 | −43, −45 |
| 70 | 38.5 | 10.1 | −37, −35 |
| 60 | 33.0 | 9.9 | −29, −20 |
| 50 | 27.5 | 9.8 | −22, −7.6 |
| 40 | 22.0 | 9.7 | −20, 4 |
| 35 | 19.3 | 9.7 | −16, 3 |

Samples of potassium formate were prepared similarly to Table 6 above with from about 20 to about 60 wt. % potassium formate, 0-2 wt. % of disodium phosphate, 0-1.75 wt. % trisodium phosphate, 0 to 0.5 wt. % sulfamic acid, 0-1 wt. % sodium nitrite, and 0-40 ppm of copper citrate. These had similar end of test metal ratings in ASTM D1384 to commercial glycol based heat transfer fluids in contact with copper, solder, brass, steel, cast iron and cast aluminum.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. It is to be understood that the upper and lower amount, range, and ratio limits set forth herein may be independently combined. While ranges are given for most of the elements of the invention independent of the ranges for other elements, it is anticipated that in more preferred embodiments of the invention, the elements of the invention are to be combined with the various (assorted) desired or preferred ranges for each element of the invention in various combinations. As used herein, the expression "consisting essentially of" permits the inclusion of substances that do not materially affect the basic and novel characteristics of the composition under consideration.

What is claimed is:

1. In a heat pump system comprising of
a) a primary refrigerant contained in a compression or absorption refrigeration equipment to pump heat between a target and heat sink (towards or from) and
b) a potassium and/or sodium salt of formic acid in water used as heat transfer fluid to transport heat away from or towards said refrigeration equipment, the improvement comprising including an alkali nitrite; 0.1 wt. % or more of a buffer component having a pH as a 1 wt. % solution in water above 10, selected from alkali metal borate, alkali metal carbonates, and alkali metal phosphates; and from at least 0.01 weight percent sulfamic acid based on the weight of said heat transfer fluid for said heat transfer fluid.

2. A system according to claim 1, wherein said heat transfer fluid includes less than 10 mole % acetate based on the total moles of formate.

3. A system according to claim 1, wherein said salt of formic acid is present from about 15 to about 75 wt. % based on the weight of said heat transfer fluid.

4. A system according to claim 1, wherein said heat transfer fluid further includes at least one of a salt of acetic acid, an alkylene glycol, and contaminants from a tap water source.

5. A system according to claim 1, wherein the amount of said buffer component having a pH above 10 is from about 0.1 to about 10 wt. %.

6. A system according to claim 5, wherein said buffer is present from about 0.5 to about 5 weight percent.

7. A system according to claim 5, wherein said buffer comprises a mixture of phosphate components giving the heat transfer fluid a pH above 9.

8. A system according to claim 1, wherein said system is a geothermal heating and/or cooling system.

9. A system according to claim 1, wherein said heat transfer fluid has a reserve alkalinity from about 5 mL to about 40 mL of 0.100 N HCl per 10 mL of sample according to ASTM D1121.

10. A system according to claim 1, wherein said system employs a compression refrigeration equipment and said refrigerant is an organic or halogenated organic refrigerant.

11. A method for providing cooling and/or heating comprising;
a) passing a primary refrigerant through a refrigeration cycle to transfer heat from the evaporator side to the condenser side,
b) contacting a heat transfer fluid with said evaporator side or said condenser side of said refrigeration cycle and thereby cooling or heating said heat transfer fluid,
c) pumping said heat transfer fluid from said evaporator or condenser side to another location and transferring heat from between said location and said heat transfer fluid, and
d) pumping said heat transfer fluid from step c back to said evaporator or condenser side of said refrigeration cycle, wherein the improvement comprises said heat transfer fluid comprising 15 to 75 wt. % of formic acid salt; an alkali nitrite; 0.1 wt. % or more of a buffer component having a pH as a 1% solution in water above 10, selected from alkali metal borate, alkali metal carbonates, and alkali metal phosphates; and from at least 0.01 weight percent sulfamic acid based on the weight of said heat transfer fluid.

12. A heat transfer composition comprising water, potassium formate, an alkali nitrite, sulfamic acid, and 0.1 wt. % or more of a buffer component having a pH as a 1% solution in water above 10, selected from alkali metal borate, alkali metal carbonates, and alkali metal phosphates based on the weight of said heat transfer fluid.

13. A heat transfer composition according to claim 12, wherein said buffer component is present from about 0.1 to about 10 wt. %.

14. A heat transfer composition according to claim 12, wherein said buffer component is present from about 0.5 to about 5 wt. %.

* * * * *